UNITED STATES PATENT OFFICE.

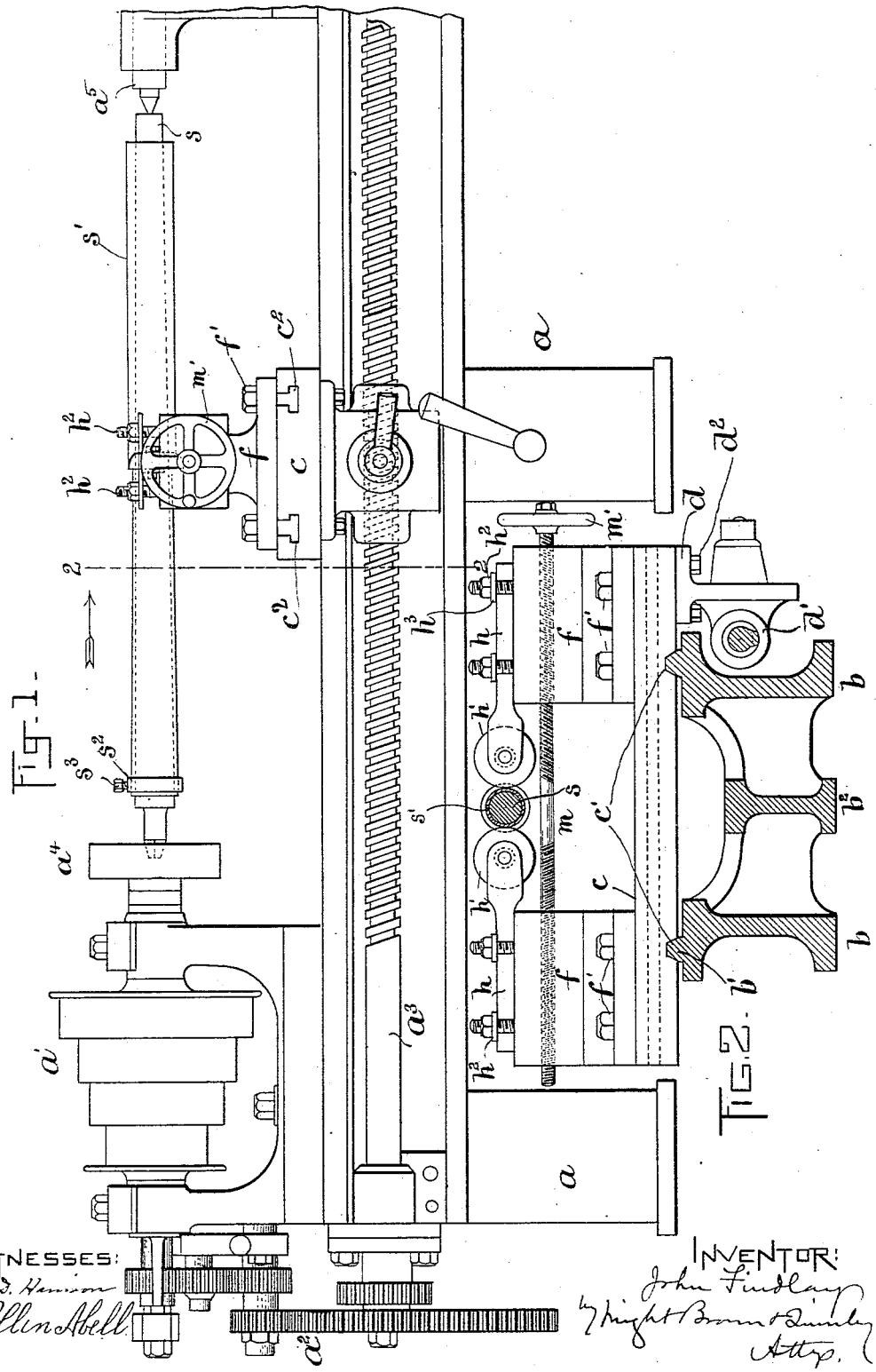

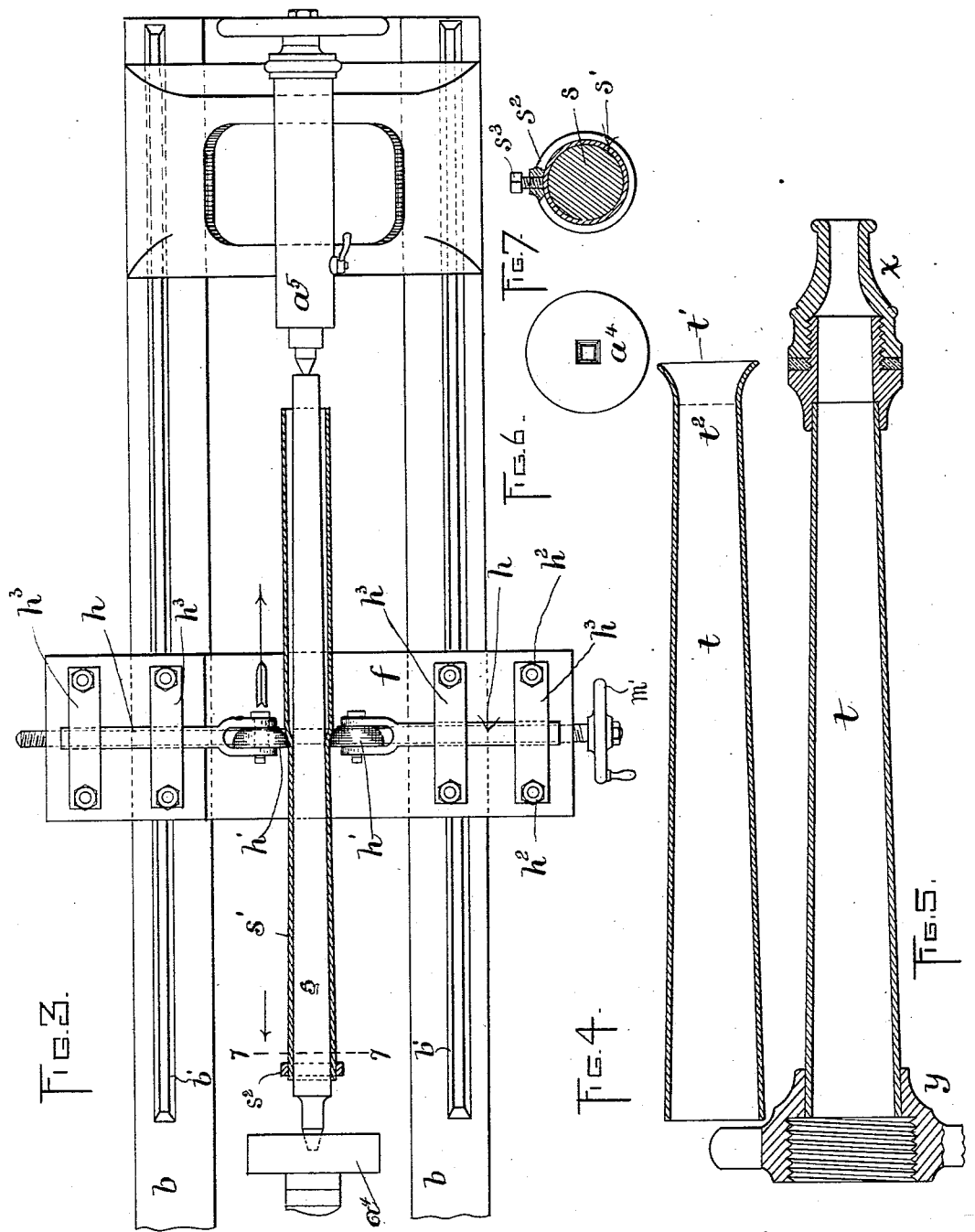

JOHN FINDLAY, OF BOSTON, MASSACHUSETTS.

MACHINE FOR MAKING SEAMLESS TAPERED TUBES.

SPECIFICATION forming part of Letters Patent No. 557,791, dated April 7, 1896.

Application filed February 25, 1895. Serial No. 539,530. (No model.)

*To all whom it may concern:*

Be it known that I, JOHN FINDLAY, of Boston, in the county of Suffolk and State of Massachusetts, have invented certain new and useful Improvements in Machines for Making Seamless Tapered Tubes, of which the following is a specification.

This invention relates to an improvement in machines for making seamless tapered tubes; and it consists in certain novel features of construction and arrangement of parts, fully described in the specification, clearly illustrated in the drawings, and particularly pointed out in the claims.

Reference is to be had to the accompanying two sheets of drawings, in which like characters indicate like parts wherever they occur.

In the drawings, Figure 1 is a front elevation of a machine embodying my invention. Fig. 2 is a cross-section on the line 2 2 of Fig. 1. Fig. 3 is a top plan view of Fig. 1. Fig. 4 represents a view of the tapered tube as it is taken from the machine. Fig. 5 is a view of the article completed and mounted in its attachments for use. Fig. 6 is a front end view of the chuck. Fig. 7 is a section on the line 7 7 of Fig. 3, showing the mandrel and clamping-ring with the material clamped between them.

Referring now to Fig. 1, $a$ represents the legs and general framework of a lathe of the conventional construction provided with a series of pulleys $a'$ for receiving power from any convenient driving-shaft and with a set of gearing $a^2$, by which motion is communicated to a screw-shaft $a^3$. $a^4$ represents a chuck mounted upon the shaft to which the pulleys $a'$ are attached. $a^5$ represents a spindle, the mandrel $s$, hereinafter described, being held by the chuck $a^4$ and the spindle $a^5$. All these parts are of the usual construction and require no additional description.

$b$ $b$ represent two parallel ways forming part of the framework of the machine. Each of these ways is provided on top with flanges $b'$, that are parallel with each other. These flanges $b'$ enter similarly-formed grooves $c'$ in the bottom of a head or block $c$, that is mounted to travel lengthwise of said machine and be guided by these flanges $b'$. The screw-threaded shaft $a^3$ is arranged to engage an interiorly-screw-threaded aperture $d'$, formed in a shoulder $d$, that is attached to the head or block $c$ by means of bolts $d^2$. By this means the head or block is made to travel in one direction or the other, according to the direction in which the screw-shaft $a^3$ rotates. Slidingly supported at each end of said head or block $c$ are plates or supports $f$. T-shaped slots $c^2$ are formed in the block $c$ at right angles to the line of travel of said block, and bolts $f'$, having T-shaped heads arranged in these slots, connect the plates $f$ and the head $c$ together and also permit the plates to slide back and forth at right angles to the line of travel of the head. Secured at the top of each of these plates or supports is an arm $h$, held to said supports by bolts $h^2$, and a bar $h^3$, forced down upon these arms by nuts. There are preferably two pairs of these bolts for each arm in order to hold the same rigid. To the inner end of each of these arms is pivoted a roll $h'$, which is approximately frusto-conical shaped in cross-section, the peripheries of these rolls being slightly convex, the wider face of each roll being arranged away from the direction in which the head and rolls are to travel while drawing the tube to a taper. A rod $m$, provided at one end with a right-hand screw-thread and at its other end with a left-hand screw-thread, is arranged in similar screw-threaded apertures in the plates or supports $f$. A hand-wheel $m'$, fast upon one end of this rod, serves as a means for turning said rod and causing the plates $f$, with their rolls $h'$, to approach or recede from each other, as desired. These rolls are preferably arranged to have their center lines in the same plane as the axis of rotation of the mandrel $s$. This mandrel has a tapered form, the degree of taper depending upon the degree of taper to which it is desired to form the article. At one end this mandrel is squared in order to engage a similarly-formed aperture in the chuck $a^4$. At the other end this mandrel is engaged by the end of the spindle $a^5$, as is usual. The cylindrical tube $s'$, which is to be drawn to a tapered form, is secured upon this mandrel by a clamp $s^2$, surrounding the material $s'$, and a set-screw $s^3$, mounted in said clamp and designed to bind the material or tube $s'$ firmly to the mandrel.

In Figs. 1 and 3 the tube or material $s'$ is shown with the tapered tube $t$ partly formed, the dimension of the tube at the right of said rolls being unchanged, while at the left of said rolls the tube has been drawn to conform to the shape of the mandrel.

The operation of the machine is as follows: The tube, preferably of brass, although any material may be used, is secured, as above described, upon the mandrel by the clamp $s^2$, the head $c$ being at the extreme left in Fig. 1 and the rolls a short distance from the clamp. In this position of parts the machine or lathe is started, the mandrel with its tube rotates, and the operator, by turning the hand-wheel $m'$, forces the rolls against the material, pressing the latter against the mandrel. The shaft $a^3$ drives the head $c$ to the right in Fig. 1, the operator all the while continuing to turn the hand-wheel $m'$ in order to compel the rolls $h'$ to force the material against the mandrel. By this operation the material is slightly stretched and is drawn and compelled to fit the mandrel, and when completed and the machine stopped it has the form shown in Fig. 4, the bell-shaped mouth $t'$ being a portion of the tube where the action of the rolls was stopped. By the form of the rolls—that is, with a convex surface and arranged with their smallest diameter in the direction of the line of travel when working—the material is drawn and shaped to the mandrel, and after the drawing is completed the bell-shaped portion $t'$ is cut off on the dotted line $l^2$, where the taper stops. Tapered tubes so made may be applied to any desired use; but they are especially useful for hose-nozzles. After the bell-shaped end $t'$ is cut off the usual hose-nozzle attachments $x$ and $y$ are fitted to the tube.

From the foregoing it will be seen that I have invented an exceedingly efficient machine for making seamless tapered tubes. The machine is one that is certain in its operation and simple in its construction. Heretofore these tubes have been made by brazing the edges of the material together, and the articles so produced are objectionable in that the tube is weak at the point of brazing and frequently breaks, whereas by my invention the tube is seamless and of uniform strength throughout.

Having thus explained the nature of my invention and described a way of constructing and using the same, though without attempting to set forth all of the forms in which it may be made or all of the modes of its use, what I claim, and desire to secure by Letters Patent, is—

1. In a machine for making seamless tapered tubes, in combination, a rotary tapered mandrel, a head mounted upon suitable ways, means for driving said head at right angles to the direction of rotation of said mandrel, plates slidingly mounted upon said head, drawing-rolls secured to the said plates on opposite sides of said mandrel, and a rod provided with right and left hand screw-threads engaging said plates, whereby said rolls can be simultaneously adjusted toward and away from said mandrel, substantially as and for the purpose set forth.

2. In a machine for making seamless tapered tubes, in combination, a tapered mandrel, one or more drawing-rolls, means for driving said rolls lengthwise of said mandrel, and means for adjusting said rolls toward and away from said mandrel, said rolls having a general frusto-conical shape with convex peripheries, the larger diameter of said rolls being arranged opposite to the longitudinal travel of said rolls, substantially as and for the purpose set forth.

In testimony whereof I have signed my name to this specification, in the presence of two subscribing witnesses, this 20th day of February, A. D. 1895.

JOHN FINDLAY.

Witnesses:
NELLIE R. WASHBURNE,
A. D. HARRISON.